United States Patent [19]

Schwab et al.

[11] 4,032,275

[45] June 28, 1977

[54] DEVICE FOR THE CONTINUOUS PRODUCTION OF A STRAND OF FOAMED MATERIAL

[75] Inventors: Johann Schwab, Vienna; Maternus Gluck, Linz-Hart; Egon Kratochvil, Maria Enzersdorf; Peter Kitzmantel, Vienna, all of Austria

[73] Assignee: Semperit Aktiengesellschaft, Vienna, Austria

[22] Filed: Dec. 4, 1975

[21] Appl. No.: 637,658

[30] Foreign Application Priority Data

Dec. 9, 1974 Switzerland .................... 16308/74
Nov. 5, 1975 Switzerland .................... 14258/75

[52] U.S. Cl. .................... 425/89; 425/224; 425/329; 425/470; 425/817 C
[51] Int. Cl.² .................... B29D 27/00
[58] Field of Search .............. 264/45.4, 45.8, 46.4, 264/51; 425/4 C, 817 C, 329, 224, 115, 89, 371, 470

[56] References Cited

UNITED STATES PATENTS

| 3,734,668 | 5/1973 | Porter | 425/4 C X |
| 3,832,099 | 8/1974 | Berg | 425/4 C |
| 3,836,298 | 9/1974 | Ernst | 425/817 C X |
| 3,887,670 | 6/1975 | Porter | 425/4 C X |

*Primary Examiner*—Francis S. Husar
*Assistant Examiner*—Mark Rosenbaum
*Attorney, Agent, or Firm*—Werner W. Kleeman

[57] ABSTRACT

A device for the continuous production of a strand of foamed material comprising a vessel to which a foamable reactant material is continuously supplied and from which said material continuously issues over a weir whose height is adjustable. The material passing over said weir becomes supported on a foaming track whose constituent parts are adjustable as regards length and inclination to suit the foaming characteristics of said material. Said foaming track is adjustable also relative to said weir so as to be kept close thereto and is also adjustable relative to a curing track.

13 Claims, 15 Drawing Figures

DEVICE FOR THE CONTINUOUS PRODUCTION OF A STRAND OF FOAMED MATERIAL

The present invention relates to a device for the continuous production of a strand of foamed material.

A device for the continuous manufacture of polyurethane foam strand products is already known, in which the reactant mixture is introduced into an overflow vessel. The introduction of the reactant mixture is carried out at a point near the base of the overflow vessel so that said mixture, when it reaches the overflow rim of the vessel, has already undergone preliminary reaction. This preliminary reacted mixture then flows over the rim of the overflow vessel, on to a foaming track which is of inclined form. The inclination of the foaming track is such that the surface of the foaming strand of material remains flat, that is to say, the inclination of the foaming track compensates precisely for the foaming characteristic of the material. In this way, it is possible to achieve the result that the stand of foam material manufactured has an approximately rectangular cross-section. This is highly advantageous because, in this fashion, the trimming or trimmed-off waste is kept small when cutting shaped elements from these strands, such for example as mattresses.

Moreover, the known method has the advantage that due to the fact that the reactant mixture has already undergone preliminary reaction at the time of overflow and then continues to foam during a descending motion, the volume/weight gradient in the downward direction is relatively small, namely, the densities of the foamed material in the neighbourhood of the base and in the neighbourhood of the top do not differ to a great extent. This, amongst other things, constitutes an economic advantage as far as the producer is concerned because he can adhere more closely to the requisite densities and does not, because of the manufacturing process, have to accept higher densities in the situation where he actually wants to produce lower ones.

This known method, of course, is open to a major drawback, which resides in the fact that the foam width is fixed, that is, it is impossible, without introducing complex modifications, to change the width of the strand of foam material being produced.

However, this is a serious drawback compared with conventional methods of production because, in continuous production of foam material and during further processing, different final dimensions are used and these can only be economically achieved if the block sizes from which the cut products are formed are correspondingly designed right from the start. Every foam manufacturer, therefore, seeks to adapt his plant so that he can modify the width of the strand of foam material during production.

The principal aim of the present invention is to overcome the drawback of lack of width adjustment in the known device whereby to provide a device for the continuous production of strands of foam material, which enables the width of the foam strand to be adjusted during operation.

In accordance with the invention this is made possible by virtue of the fact that:

1. the overflow vessel and the forming track are adjustable in width;
2. the lateral conveyors can be adjusted to accord with the width adjustment of the foaming track;
3. the inclination of the foaming track is at least partially adjustable;
4. the interval between the curing track and the overflow vessel can be modified;
5. if required, the curvature of the foaming track is adjustable; and
6. possibly also the overflow vessel height is adjustable.

Should it become necessary, during the course of production of a strand of foamed material, to alter the width, this can be brought about using the device in accordance with the invention. To this end, it is necessary to correspondingly alter the width of the overflow vessel and that of the foaming track, and to adjust the lateral conveyors to the requisite position to correspond with this width adjustment. If, in addition to a change in the width of the foamed strand, the mix and therefore the foaming characteristics are changed in the course of manufacture, then in addition the inclination of the foaming track must be adjusted at least partially and, possibly, the curvature of the foaming track will need to be adjusted as well. The more quickly a foam reactant mixture reacts, the greater the inclination of the foaming track must be. There are also reactant mixtures whose foaming characteristic does not change in a continuous way so that it is necessary, in order to acquire a flat surface in the strand of foam material, for the foaming track to be curved convexly or concavely or in some other manner. Again, this facility is provided in accordance with the present invention so that virtually any situation likely to arise (as regards reactant mix and product width) can be dealt with whilst always maintaining maximum economy.

The manufacture of an overflow vessel of adjustable width, creates difficulties especially because the foamable reactant mixture is generally chemically aggressive and the sealing problem is therefore a difficult one to resolve. The present invention therefore arranges for the overflow vessel walls to consist of elastic, extensible material (for example, of rubber) which are attached to a rigid, extensible structure. This kind of overflow vessel has no joints into which the reactant mixture can penetrate so that without any risk of fouling, its width can be adjusted at will during a production run. The extensible structure can for example consist of trough halves which telescope into one another. The extensible walls are in this context attached only to the side walls of the trough halves so that when the structure is extended, the stretch in the material is distributed over the full width of the overflow vessel. In this way, the trough width can for example be increased by for example two to three times. The fixing of the relative positions of the trough havles can be performed by a mechanical locking arrangement; however, it is equally possible to adjust the width of the overflow vessel by displacing the trough halves under the control of electrically or hydraulically operated devices which simultaneously fix the said trough halves in the relative positions to which they have been adjusted.

To introduce the reactants into the overflow vessel, it has been found advantageous if pipes whose spacing from one another is adjustable and which extend to a point close to the vessel base, are provided. These pipes can for example consist of a flexible material which enables particularly simple adjustment of said spacing; the ability to alter said spacing is necessary if the width of the overflow vessel is to be changed. In principle, it is possible of course, for connections to be directly fixed in the elastic wall (for example, vulcanised in situ), these being able to move in elongated holes formed in the extensible structure, as the width of the overflow vessel is modified. This second-mentioned embodiment, of course, is not so advantageous because it makes maintenance somewhat more difficult.

As already explained above, it is frequently necessary during changes in mix to modify not only the magnitude but also the nature of the inclination in the foaming track. In this context, it has been found advantageous if the foaming track is made up of at least two foaming conveyors. In this way, it is also possible to take account of a non-linear foaming characteristic. The number of foaming conveyors which go to make up the foaming track is theoretically unlimited but, in practice, a satisfactory result is generally obtained using three to four foaming conveyors, so that the foaming track can be satisfactorily adapted for all mixes, procuring the result that the surface of the manufactured foamed strand is flat and the strand itself has a rectangular cross-section.

In order, from the plant point of view, to effect adaptation of the foaming track as quickly and accurately as possible, it will be convenient to ensure that the point of reversal (adjoining the overflow vessel) of the topmost foaming conveyor, is vertically adjustable, synchronously with the overflow vessel, and if the point of reversal (adjoining the curing track) of the lowermost foaming conveyor is adjustable horizontally, synchronously with the length of the curing track, whilst all the other points of articulation of the foaming conveyors are adjustable horizontally and vertically in accordance with the foam rise characteristic. The adjustment of the points of reversal can be performed hydraulically or by means of spindles, depending upon how large the installation is and how many foaming conveyors it possesses, so that on the one hand the force required to move the points of reversal and on the other hand the space available beneath the foaming track, are determined.

When using very fast-reacting reactant mixtures, the pitch of the foaming track must be steep so that it may be necessary to shorten the track. To bring this about, it has been found to be advantageous if the foaming conveyors which form the foaming track are adjustable in length by the provision of vertically adjustable compensating rollers. On the one hand, the other two points of reversal of the foaming conveyor can be moved towards one another and on the other the belt or the like forming the foaming conveyor, can be tensioned again by means of the compensating rollers. To this end, the compensating rollers are moved downwards until the desired tension is achieved.

One problem which arises from the approach adopted by us and which must be solved is the adjustment of the width of the foaming track to correspond with requirements. Conventional devices have a plate belt whose design is fundamentally complicated because the individual plates overlap one another in the manner of fish-scales to leave the smallest possible gap. It has to be borne in mind, in this context, that it is of critical importance where the proper functioning of the device is concerned, that any fouling which occurs should not impair its serviceability. The risk of fouling in the manufacture of strands of foam material made of reactive substances, (for example, of polyurethane components) inevitably leads to a certain process danger, this being so even if the mixture of reactants is applied to a paper web which protects the underlying foaming conveyor from the effects of penetration of the mix. In the first place, the paper used in this sort of application generally does not provide a 100% seal and, secondly, no complete guarantee can be given that the paper web will not tear. Such tearing would allow the reactant mix to reach the foaming web and the latter must of course be corroded by the mix nor must it be rendered unserviceable, thereby when it has set. This requirement must furthermore be combined with that of a foaming track which is adjustable in width. With this broad object in mind, it has been found to be advantageous if the foaming track or foaming conveyors have at least two comb sections whose spacing from one another can be adjusted and this can be achieved by providing two combs which are displaceable relatively to one another and have their teeth facing each other. The width of the teeth of the comb sections determines the forming intermediate space. A further advantage of mutually adjustable comb sections lies in the relatively small amount of space they occupy and in the very simple mode of operation, features which both have an important bearing upon the maintenance aspect of the device.

The widths of a foamed strand of material, most frequently required in practice vary between 1 and 2.5 meters. This kind of width adjustment cannot be achieved simply by using two comb sections. It is necessary for the foaming track instead to have at least three comb sections. Particularly convenient for this purpose is the embodiment in which the foaming track or foaming conveyors possess three comb sections, the centre section being arranged so that it cannot move laterally, whilst the two outer sections are laterally displaceable in relation to it. This design enables the foam width to be varied within the requisite range and furthermore ensures very high stability because the central comb section is arranged to move only in the direction of transfer.

In order to achieve optimum flatness on the part of the foaming conveyor formed by the comb sections, it has been found to be convenient to ensure that the comb teeth are provided longitudinally with a tongue-like projection and a mating groove for mutual guidance. The tongue-like projection on one comb tooth, engages in the groove in the next so that no difference in height between the individual comb teeth can occur. The tongue-like projection and the groove can also have undercuts to give them a dovetail shape so that even better fixing of the comb teeth to one another, is ensured. The essential thing, however, is that the connection between the comb teeth should leave sufficient clearance to enable the foaming conveyor to articulate when changing direction. One embodiment which particularly favours this articulation, is one in which the tongue-like projection and the complementary groove are of arcuate (circular segment) shape in cross-section, so that they co-operate in a manner similar to a ball joint.

Another embodiment of the design of the foaming track is one in which it or the foaming conveyors in each case exhibit two rails whose spacing from one another can be adjusted, in which rails nonextensible cords, wires or the like are movably guided by means of terminals, sliders, rollers or the like. If the rails are moved apart, then the sliders can move towards one another in the rails so that the direction of the cord approaches the normal to the rail. At the same time, the foaming conveyor is shortened and this is taken account of by corresponding length-compensating rollers so that there is no reduction in the tension of the conveyor. If the foamed width is to be reduced again, then the rails are moved towards one another and the length-compensating roller or rollers is/are moved down, corresponding to the extension of the foaming conveyor, the riders secured to the ends of the cords, moving away from one another again, in the rails, and the cord direction tending towards the rail direction. This particular embodiment of the foaming track requires a doubling of the length when the width is reduced by half, so that the length-compensating roller or rollers require(s) a correspondingly long travel, and this has the result that this design is less favourable in large plants because of the amount of space required. In smaller devices, however, it operates extremely satisfactorily.

Another embodiment of the variant outlined above, is one in which the cords, wires or the like are arranged in the form of a lattice-work and are connected together at the intersection points. This means that the load bearing capacity of the foaming conveyor is particularly high and the space between the cords can be kept small.

As already explained hereinbefore, it is an essential feature that fouling of the foaming track should not lead to any impairment of the moving parts of the device, so that it is necessary for the foaming track to be covered insofar as it may contain any openings. In this context, a particularly favourable solution is one in which the foaming track or foaming conveyors is/are covered over the full area by a web of an elastic material, for example by a web of rubber or polyurethane. The important factor is that the material should be capable of withstanding extensions of at least 250 to 300% over a lengthy time interval, and should not suffer any impairment of its properties even in the event of contact with the reactants. The elastic materials of the web can also consist of an extensible weave, knitted product or the like, if this is appropriate to the solution of the fouling problem.

In order to prevent the development of protuberances at the edge of the foaming track, causing by whatever fixing elements are to be used for the web of elastic material, it has been found to be convenient for the latter to be attached laterally to the edge of the comb sections or rails, by means of sunken clamping strips, that is, by clamping strips whose top or upper surfaces are below that of the said web. Any formation of irregularities at the edge of the foaming track leads to disturbances in the foam structure and to a departure from the flat surface of the foamed strand and consequently from the desired rectangular cross-section.

The central comb section can also be covered by a foil (for example, by a metal foil) attached to it, whilst in order to cover the outer movable comb sections, foils are provided which are attached to said sections only at the edge. These foils overlap one another to a maximum extent when the foaming track is adjusted to the smallest width, and can slide apart when the width of the track is increased. The thickness of the foils must be such that no problems occur at the points of reversal of direction. Again, materials other than metal (for example synethetic materials) could be used for said foils.

In altering the width of the foaming track, it is necessary in each case to return the lateral conveyors to the corresponding position at the edge of the foaming track. This can conveniently be brought about by arranging for the lateral conveyors to be guided on rails extending normally vis-a-vis the foaming track. This method of guidance is advantageous too in a situation where maintenance operations have to be carried out beneath the foaming track, because in this way lateral conveyors can without any problem, be removed from the foaming track sufficiently far to enable maintenance to be performed.

The present invention will now be more particularly described with reference to the accompanying diagrammatic drawings, in which.

Figure 1:
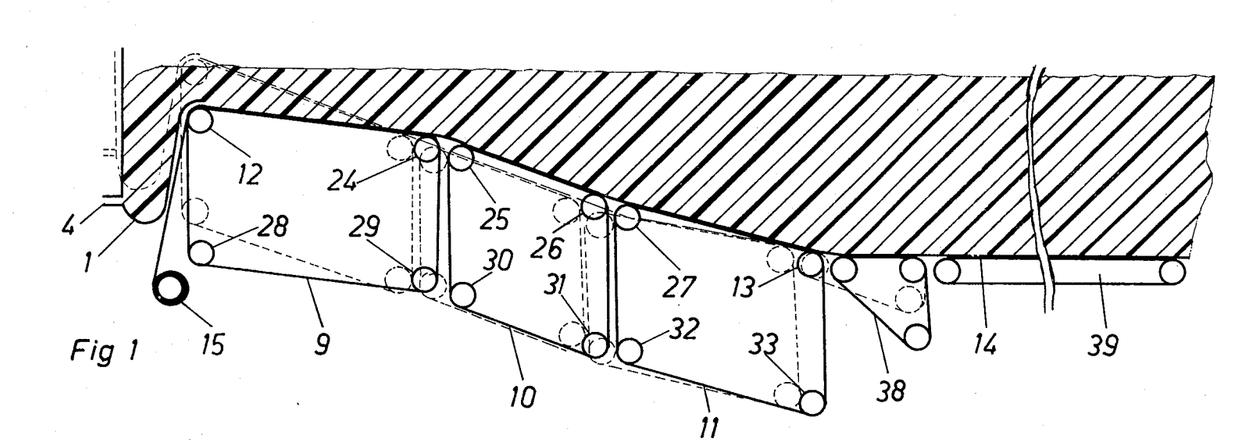
FIGS. 1 and 2 illustrate side elevational and plan views of a generally preferred embodiment of a device in accordance with the invention.

The device shown in FIG. 1 for the continuous manufacture of a foamed strand includes an overflow vessel 1 into which a reactant mixture is continuously introduced. The pre-reacted mixture then issues from the vessel 1 onto a foaming track 3, which consists of three foaming conveyors 9, 10 and 11 adjustable in height, width and length. The overflow vessel 1 is also vertically adjustable so that, where a steeper foaming characteristic obtains, said vessel 1 can be adjusted vis-a-vis the foaming track 3, (see the dotted line configuration in FIG. 1). The top-most point of reversal 12 of the foaming conveyor 9 which is nearest to the vessel is adjustable exclusively vertically, corresponding to the height of the vessel 1 and the bottom-most point of reversal 13 of the foaming conveyor 11 which is farthest from the vessel is purely adjustable horizontally in accordance with the length of the curing track and the inclination of the foaming track. The other points of reversal 24, 25, 26 and 27 are horizontally and vertically adjustable. In order to tension the foaming conveyors when their length has been shortened, length-compensating or take-up rollers 28 to 33 are provided which are vertically adjustable so that that area of the foaming conveyor which is available for the support of the foam can be reduced or increased.

Figure 2:
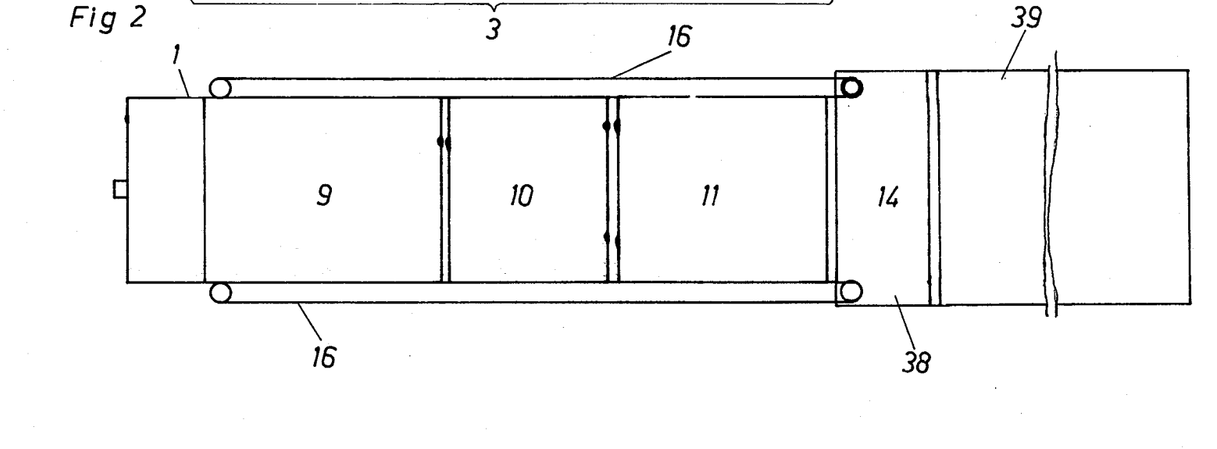

FIG. 2 illustrates a schematic plan view of the device shown in FIG. 1. In particular, lateral conveyors 16 can be seen therein, these being arranged a little above the curve track 14 (that is upstream of said curing track 14) adjacent the foaming track 3. The curing track 14 has, right from the start, a maximum width so that width adjustment thereof is unnecessary. This is possible because the lateral conveyors can be guided at a very short distance above it. Advantageously the curing track 14 will be split in two in the zone adjoining the foaming track 3, and will therefore consist of a belt 38 which is adjustable in length by means of a compensating roller (see the dotted line configuration thereof in FIG. 1) and of a fixed-length conveyor belt 39. Instead of a conveyor belt, the portion 39 may be constituted as a roller track.

Figure 3:
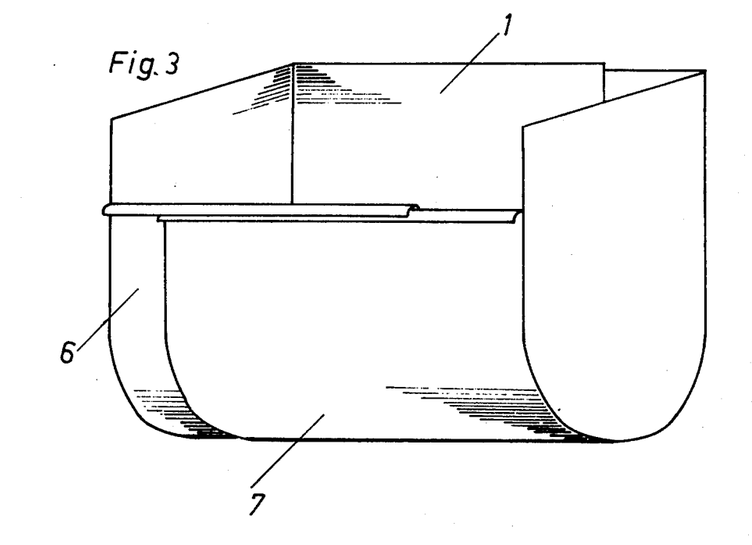
FIGS. 3, 4 and 5 illustrate the overflow vessel.

FIG. 3 illustrates a front perspective view of one embodiment of an overflow vessel 1 and, in order to be able more clearly to comprehend the extensible design, the wall or walls of elastically extensible material have not been shown. The vessel halves 6, 7 can be telescoped into one another and the rim or weir over which the forming material will flow is curved outwards so that the foaming material will flow directly onto the foaming track 3.

Figure 4:
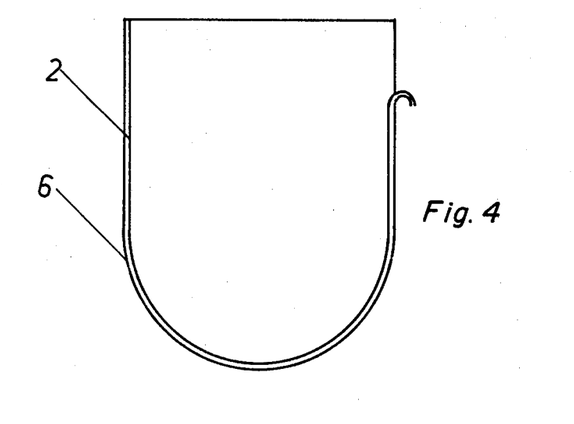

FIG. 4 illustrates a schematic vertical cross-section through the overflow vessel 1 and shows the arrangement of the membrane 2 of extensible material, preferably rubber. This membrane 2 is not attached to the longitudinal (overlapping) wall sections of the overflow vessel 1 but is only attached to the substantially U-shaped end walls so that, when the structure is extended, the stretch in the material is distributed over the full width of the vessel.

Figure 5:
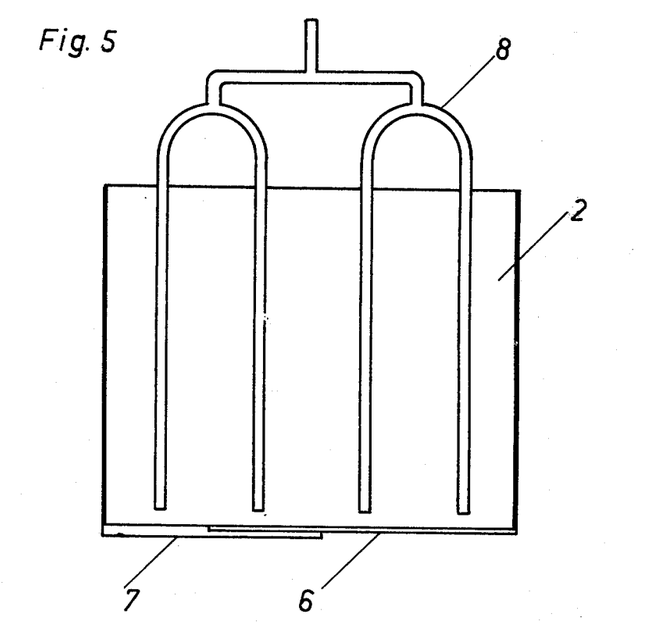

FIG. 5 illustrates a schematic horizontal cross-section through the overflow vessel 1 and in particular illustrates the arrangement of pipes 8 used to introduce the reactant components into said vessel.

Figure 6:
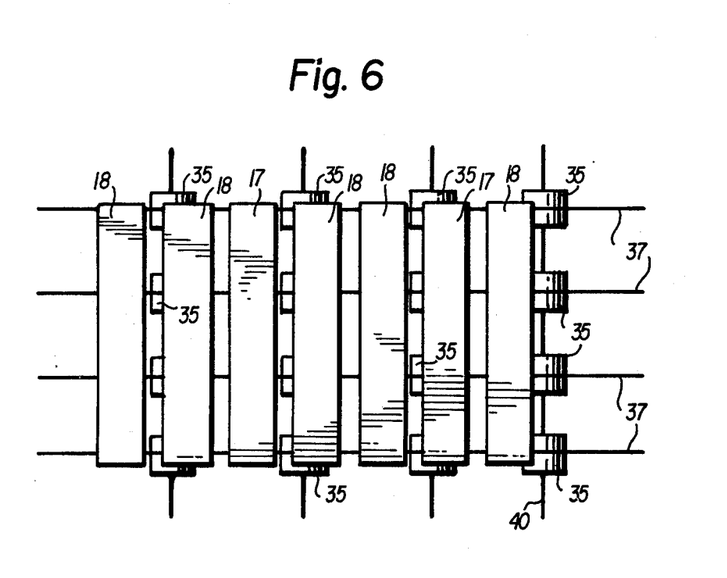
FIGS. 6, 7, 7a, 8, 8a, 9 and 10 illustrate a foaming conveyor of comb design.

FIG. 6 illustrates a foaming conveyor 9, 10, 11 consisting of comb sections 17, 18. The central comb section 17 is so arranged that it cannot be displaced laterally while the two external comb sections 18 are movable in relation to the section 17. The external sections 17 are held together, for example, by cables 37 so that no problems can arise as far as reversal of motion is concerned, and the sections 18 are similarly held together by other cables 37. Downwardly projecting elements 36 on the comb teeth serve to guide and support the conveyor sections on rollers 35 which are, in turn, mounted on shafts 40. The height of the elements 36 must be such that the rollers 35 can properly guide them. The sections 18 run on the outer rollers 35, i.e., the left-hand and right-hand rollers in FIG. 7, and the sections 17 run on the inner rollers 35, i.e., the middle two rollers in FIG. 7.

Figure 7:
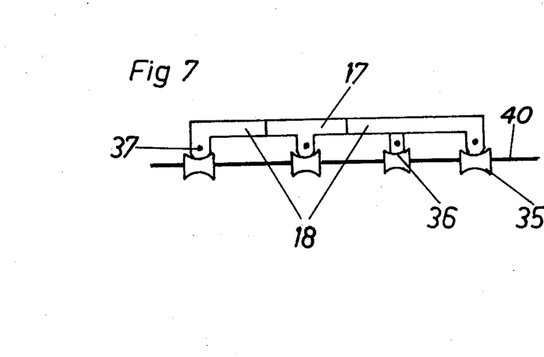
Figure 7A:
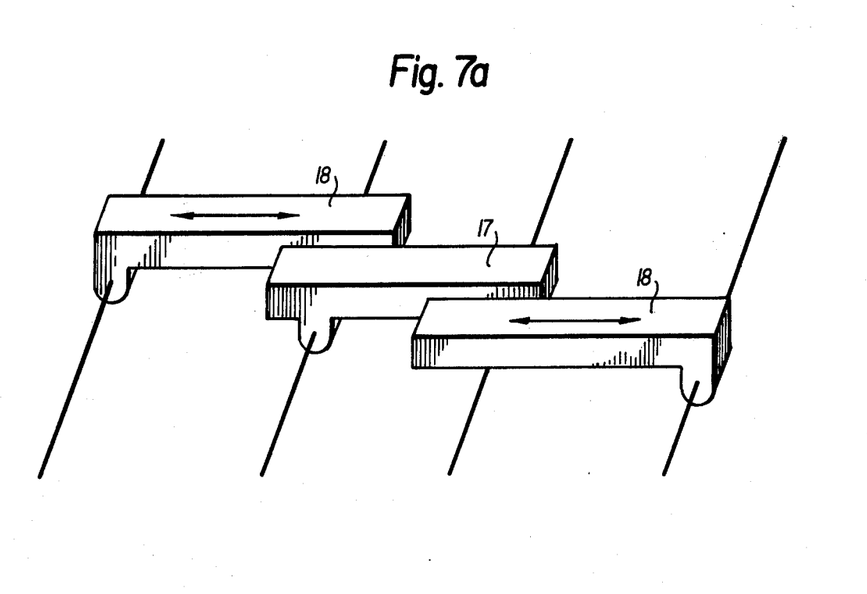

FIG. 7 illustrates a cross-section through a conveyor 9, 10, 11 made up of comb sections and FIG. 7a is a simplified perspective view of the conveyor. The downwardly projecting elements 36 on the comb teeth can be seen in FIG. 7a. It is in these projections 36 that the cables 37 which hold the teeth together are arranged. The rollers 45 support and guide the projections 36. Whereas the central pair of rollers 35, serving to support the central comb section 17, is arranged for non-lateral movement along shaft 40, the pair of outer rollers 35 which support and guide the external, mobile comb sections 18, can move laterally so that by moving these rollers inwards or outwards on shaft 40 the comb sections 18 are carried with them and the conveyor 9, 10, 11 is widened or narrowed.

Figure 8:
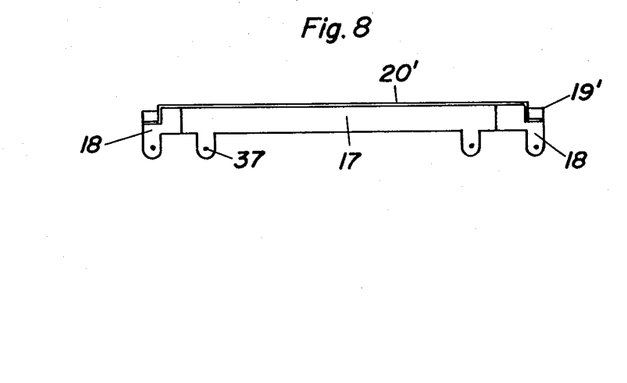

FIG. 8 illustrates the attachment of a flexible covering web 20' by means of clamping strips 19' to the mobile comb sections 18. The clamping strips 19' must be made of flexible material so that they do not interfere with the reversal of motion. Instead of the clamping strips, it is possible to provide a clamping block for each tooth, which block can be made of rigid material. Again, any other mode of attachment of the flexible web 20' is possible, provided that it ensures that no protuberances exist at the top or upper side of the conveyors 9, 10 and 11. For example, it is possible for the flexible web 20' to be provided with thickened zones at the edge, which can be "buttoned", as it were, or pushed in the manner of the male portions of press fasteners, into corresponding openings therefor. The elastic material of the web 20' can for example, be constituted by rubber. In addition to the high degree of extensibility which the material must possess, a certain degree of temperature resistance (to withstand with the heat of reaction of, for example, polyurethane foam) must be an inherent characteristic thereof and the material must furthermore not be sensitive to any reactant mix which happens to penetrate through the protective paper web.

Figure 8A:
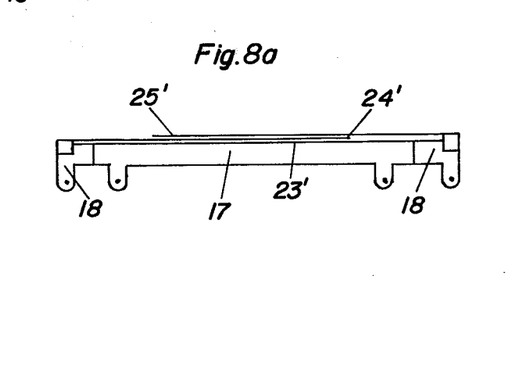

In FIG. 8a, there is illustrated another possibility for covering the comb sections by means of a flexible track. The reference characters 23', 24' and 25' constitute foils, for instance sheet metal, which completely cover the comb parts for any width. The lowermost sheet metal member 23' covers the central comb section 17 and is connected therewith. The sheet metal members 24' and 25' are each secured at one edge with a respective comb portion 18 so that the sheet metal part 24', 25', during movement a part of the comb portions 18, can slide one above the other.

Figure 9:
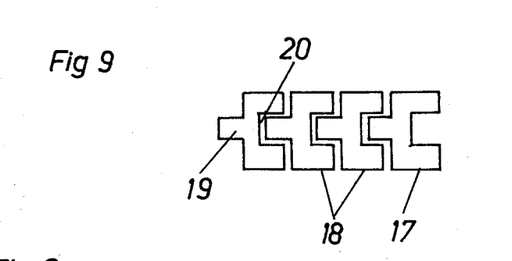
Figure 10:
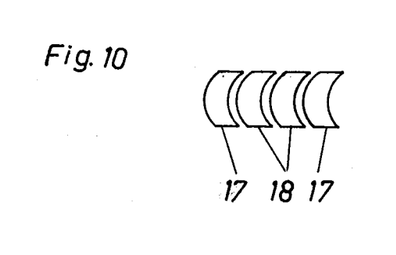

FIGS. 9 and 10 illustrate variants of the system of mutual guidance of the comb teeth. In FIG. 9, each comb tooth has at one end a tongue-like projection 19 extending in a longitudinal direction whilst at the other end thereof a groove 20 is provided. In FIG. 10, the corresponding opposite walls of the comb teeth are respectively concave and convex so that likewise mutual guidance is achieved. The latter variant is particularly advantageous because it ensures frictionless reversal of direction of the conveyor 9, 10, 11.

Figure 11:
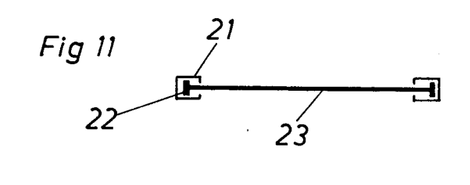
FIGS. 11, 12 and 13 illustrate the foaming conveyor designed as a net.
Figure 12:
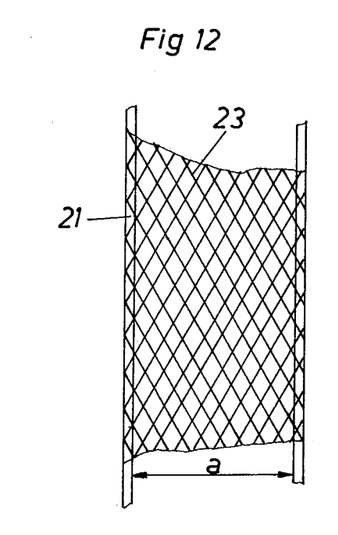
Figure 13:
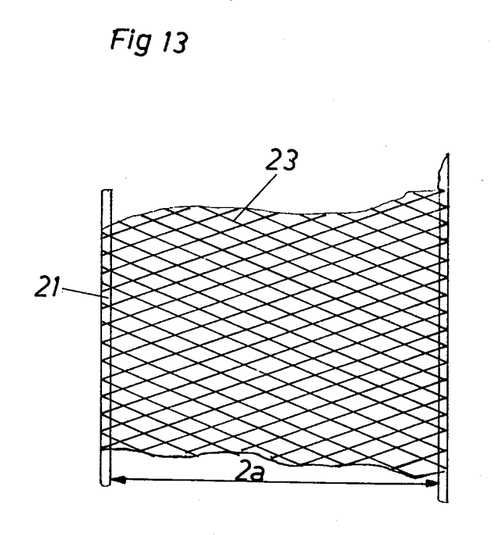

In FIG. 11, a foaming conveyor 9, 10, 11 has been shown which includes two rails 21 whose mutual spacing can be varied. In the rails by means of sliders 22, cores 23 are movably guided, said cores being longitudinally inextensible but being formed into a latticework as shown in FIGS. 12 and 13. In operation, the cords are tensioned so that no deflection occurs under load.

FIG. 12 illustrates a conveyor 9, 10, 11 of this kind, having a width $a$. The cords 23 thereof, which are attached together lattice fashion, extend at an angle of about 30° to the rails 21. If the width is approximately doubled, as shown in FIG. 13, the cords move closer together and if the angle which they make in relation to the rails 21, approaches 70°. Simultaneously, of course, the overall foaming conveyor shortens by a half, this shortening having to be compensated for by the corresponding length-compensating rollers. Self-evidently, it is also possible to take account of the requisite change in length in the foil, when the width of the foaming track changes, by arranging for the cords to be stored with an appropriate surplus length on reels or the like, under spring load, so that when the width is increased, part of the surplus length is paid off. When the width is reduced, on the other hand, this excess length is wound back on to the reel under spring load. Consequently, the large change in length in the foaming track is avoided although the design of the conveyor belt itself becomes more complex. In particular with this embodiment of the foaming conveyor, but for that matter with any other embodiment, it will be found to be convenient if the device is fixed at one side and is extensible laterally only at the other. This means that the lateral conveyor can be fixed at one side and that the rails 21 can, in terms of their lateral adjustment facility, also occupy a constant position at this side. It is only at the other side that the facility for lateral motion on the part of both the rail 21 and of the lateral conveyor 16, must be provided. This possibility should be borne in mind whenever a symmetrical adjustment facility on the part of the structure is not absolutely essential, because the complete adjustable mechanism need in that event be provided at one side only.

Referring again to FIG. 5, the pipes 8 are so made that their mutual spacing is adjustable in correspondence with the extent to which the vessel halves 6, 7 have been telescoped; also said pipes extend into said vessel at points close to the bottom thereof as can be seen in FIG. 1 in which short stub pipes 4 form connections to which the pipes 8 are connectible.

Although, in the appended claims, no explicit mention has been made of the fact, it is entirely in accordance with the present invention that the foaming track 3 may consist of at least two mutually displaceable but otherwise stationary flexible plates, e.g. metal sheets, whose inclination and curvature could be adjusted by hydraulic cylinders or the like, thus creating the facility for width adjustment.

We claim:

1. In a device for the continuous production of a strand of foamed material including an overflow vessel for the foamable mixture, said overflow vessel having end walls defining the width thereof, a downwardly inclined foaming track at the outlet of the overflow vessel, a horizontal curing track positioned downstream and spaced from the overflow vessel and foaming track and lateral conveyors arranged adjacent each lateral side of the foaming track, the improvement comprising said overflow vessel including means operatively associated with said overflow vessel for adjusting the width thereof, an elastic membrane connected adjacent the end walls of the overflow vessel, said membrane being extensible between said end walls as the width of said overflow vessel is adjusted, means operatively associated with said foaming track for adjusting the width of said foaming track and a flexible web connected adjacent the lateral sides of the foaming track, said web being extensible between said lateral sides as the width of said foaming track is adjusted.

2. The improvement according to claim 1, wherein said overflow vessel comprises telescopic trough halves defining the means for adjusting the width thereof.

3. The improvement according to claim 1, including a plurality of spaced pipes connected to said overflow vessel for introducing the foamable mixture into a lower portion of the overflow vessel and means operatively associated with said spaced pipes for adjusting the spacing between said pipes.

4. The improvement according to claim 1, wherein said foaming track comprises at least two foaming conveyors.

5. The improvement according to claim 4, wherein said overflow vessel is provided with a weir over which said foamable mixture is adapted to flow and including first means operatively associated with said curing track for adjusting the spacing between the curing track and overflow vessel, second means operatively associated with said overflow vessel for adjusting the vertical height of said weir with respect to said curing track, one of said foaming conveyors having a first point of reversal adjacent said overflow vessel, third means operatively associated with said one foaming conveyor for adjusting the vertical height of said first point of reversal synchronously with the vertical adjustment of said weir, another of said foaming conveyors having a second point of reversal adjacent said curing track, and fourth means operatively associated with said another foaming conveyor for horizontally adjusting said second point of reversal synchronously with the adjustment of the spacing between the curing track and overflow vessel.

6. The improvement according to claim 5, wherein said foaming conveyors include further points of reversal, means operatively associated with said foaming conveyors for horizontally adjusting selected ones of said further points of reversal in accordance with the foaming characteristics of said foamable material and means operatively associated with said foaming conveyors for vertically adjusting selected ones of said further points of reversal in accordance with the foaming characteristics of said foamable material.

7. The improvement according to claim 6, wherein the length of at least one of said foaming conveyors is adjustable by means of vertically adjustable rollers.

8. The improvement according to claim 1, wherein the foaming track includes a substantially fixed central comb section and outer comb sections arranged on opposite sides of said central comb section and means operatively associated with said comb sections for laterally moving said outer comb sections relative to said central comb sections to vary the width of said foaming track.

9. The improvement according to claim 8, wherein said comb sections include comb teeth, said comb teeth having mutually interengaging tongue-like projections and grooves for guiding the comb sections relative to each other.

10. The improvement according to claim 8, wherein said flexible web is connected to the lateral sides of said outer comb sections by clamping strips having upper surfaces, the upper surfaces of said clamping strips being arranged below the surface of said web.

11. The improvement according to claim 8, wherein the central comb section is covered by a foil which is attached to said central comb section and the outer comb sections are each covered by a foil attached to the edges thereof.

12. In a device for the continuous production of a strand of foamed material including an overflow vessel for the foamable mixture, said overflow vessel having end walls defining the wdith thereof, a downwardly inclined foaming track at the outlet of the overflow vessel, a substantially horizontal curing track positioned downstream and spaced from the overflow vessel and foaming track and lateral conveyors arranged adjacent each lateral side of the foaming track, the improvement comprising said foaming track including side rails, means operatively associated with said rails for adjusting the spacing between said rails, substantially non-extensible cordlike members extending between said rails and means in said rails for movably guiding said cord-like members along said rails.

13. The improvement according to claim 12 wherein said cord-like members are arranged in the form of a lattice work, said cord-like members forming points of intersection with each other and being attached together at said points of intersection.

* * * * *